US009372709B2

(12) United States Patent
Ciano et al.

(10) Patent No.: US 9,372,709 B2
(45) Date of Patent: Jun. 21, 2016

(54) DISTRIBUTION OF A SERVICE IMPLEMENTED BY INTRA-CONNECTED VIRTUAL MACHINES

(71) Applicant: International Business Machines Corporation, Armonk, NY (US)

(72) Inventors: Giuseppe Ciano, Rome (IT); Marco De Santis, Rome (IT); Maurizio Simeoni, Fiuggi (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/489,760

(22) Filed: Sep. 18, 2014

(65) Prior Publication Data
US 2015/0106810 A1 Apr. 16, 2015

(30) Foreign Application Priority Data

Oct. 10, 2013 (GB) .................................. 1317901.5

(51) Int. Cl.
*G06F 9/455* (2006.01)
*G06F 9/44* (2006.01)
(52) U.S. Cl.
CPC ........ *G06F 9/45533* (2013.01); *G06F 9/45558* (2013.01); *G06F 2009/4557* (2013.01)
(58) Field of Classification Search
CPC ... G06F 8/61; G06F 9/45533; G06F 9/45558; G06F 2009/4557
USPC .................. 717/101–103, 120–122, 168–178; 718/1
See application file for complete search history.

(56) References Cited

U.S. PATENT DOCUMENTS 7,849,168 B2   12/2010   Utsunomiya et al.
7,966,364 B2    6/2011   Sundaram et al.
(Continued)

FOREIGN PATENT DOCUMENTS

WO    WO2011/069782 A1    6/2011

OTHER PUBLICATIONS

Konstantinou et al., "An Architecture for Virtual Solution Composition and Deployment in Infrastructure Clouds", 2009, ACM, pp. 9-17.*

(Continued)

*Primary Examiner* — Ted T Vo
(74) *Attorney, Agent, or Firm* — Francis Lammes; Stephen J. Walder, Jr.; Parashos T. Kalaitzis

(57) ABSTRACT

A mechanism is provided for distributing a service implemented by a plurality of infra-connected source virtual machines on a source computing environment. Characteristic information of the service comprising an indication of the intra-connected source virtual machines and of each intra-connection between the intra-connected source virtual machines is discovered. The source virtual machines are copied into corresponding target virtual machines on a target computing environment. Reconfiguration information of at least one selected target virtual machine of the target virtual machines is saved that has a source identity of the corresponding source virtual machine in the source computing environment being reconfigured into a target identity of the at least one selected target virtual machine in the target computing environment. Each communication, addressed to each source identity by each target virtual machine intra-connected to a corresponding selected target virtual machine, is redirected to the corresponding target.

20 Claims, 4 Drawing Sheets

(56) References Cited

U.S. PATENT DOCUMENTS

| | | | | |
|---|---|---|---|---|
| 8,108,855 | B2* | 1/2012 | Dias | G06F 8/60 709/203 |
| 8,171,470 | B2* | 5/2012 | Goldman | G06F 8/61 717/120 |
| 8,423,646 | B2 | 4/2013 | Jamjoom et al. | |
| 8,464,249 | B1* | 6/2013 | Goldman | H04L 63/0876 705/51 |
| 2007/0101323 | A1 | 5/2007 | Foley et al. | |
| 2009/0198817 | A1 | 8/2009 | Sundaram et al. | |
| 2011/0004676 | A1* | 1/2011 | Kawato | G06F 9/5044 709/221 |
| 2011/0179176 | A1 | 7/2011 | Ravichandran et al. | |
| 2012/0173757 | A1 | 7/2012 | Sanden | |
| 2012/0254862 | A1 | 10/2012 | Dong | |
| 2013/0086580 | A1 | 4/2013 | Simonsen et al. | |
| 2013/0166504 | A1 | 6/2013 | Varkhedi et al. | |
| 2013/0166749 | A1 | 6/2013 | Kruglick | |
| 2014/0244845 | A1* | 8/2014 | Liu | H04L 67/1065 709/226 |

OTHER PUBLICATIONS

Search Report under Section 17(5) dated Feb. 24, 2014, Application No. GB1317901.5, 5 pages.

Al-Kiswany, et al., "VMFlock: Virtual Machine Co-Migration for the Cloud", Proceedings of the 20th International Symposium on High Performance Distributed Computing, http://www.ece.ubc.ca/~samera/papers/VMFlock-HPDC11.pdf, San Jose, California, Jun. 8, 2011, 13 pages.

Bernstein, David et al., "Blueprint for the Intercloud—Protocols and Formats for Cloud Computing Interoperability", 2009 Fourth International Conference on Internet and Web Applications and Services, Venice, May 24-28, 2009, pp. 328-336.

Ciano, Giuseppe et al., "A method and a system for plug and play support of computer architectures", EP Application 09178756.4 filed Dec. 10, 2009, now abandoned, 44 pages.

Fu, Song et al., "Service Migration in Distributed Virtual Machines for Adaptive Grid Computing", 2005 International Conference on Parallel Processing, Jun. 14-17, 2005, 8 pages.

Pu, Yan et al., "Cloud Rack: Enhanced Virtual Topology Migration Approach with Open vSwitch", IEEE International Conference on Information Networking (ICOIN), Barcelona, Jan. 26-28, 2011, pp. 160-164.

Ramakrishnan, K. K. et al., "Live Data Center Migration across WANs: A Robust Cooperative Context Aware Approach", 2007 SIGCOMM workshop on Internet Network Management, http://www.research.att.com/export/sites/att_labs/techdocs/TD_732RN6.pdf, Japan, Aug. 27-31, 2007, 6 pages.

* cited by examiner

DISTRIBUTION OF A SERVICE IMPLEMENTED BY INTRA-CONNECTED VIRTUAL MACHINES

BACKGROUND

The present disclosure relates to the information technology field. More specifically, this disclosure relates to the distribution of a service implemented by intra-connected virtual machines.

Virtual (computing) machines are commonly used to emulate physical (computing machines by software on a (host computing environment. Particularly, multiple virtual machines may be intra-connected, in order to communicate among them so as to implement a service (providing a self-contained basic task that may be invoked through a well-defined interface). A typical example is a web application having a web tier (implementing its user interface), an application tier (implementing its processing logic) and a back-end tier (implementing its data storing); in this case, each tier of the web application may be implemented by one or more different virtual machines (in a number suitably scaled according to its workload).

Each service may be deployed on the computing environment as a virtual appliance; the virtual appliance is a software appliance (i.e., a software solution for performing a specific user task being encapsulated in a pre-built, self-contained deployment package), which is designed to run in a virtualized environment. For this purpose, the deployment package of the virtual appliance comprises the definition of its virtual machines; for each virtual machine, the deployment package also comprises a software image (or more), which represents a content of its mass memory with one or more application programs (for implementing the service) and a Just Enough Operating System, or JeOS (i.e., a limited operating system specifically tailored to support the application programs). The deployment of the virtual appliance involves the instantiation of the corresponding virtual machines on the computing environment (according to their definition in the deployment package); the software images (possibly converted into a runtime format that may be recognized by a virtualization layer of the computing environment) are attached to the corresponding virtual machines as virtual disks (emulating corresponding physical disks), so as to cause their booting therefrom. Generally, the correct operation of the virtual machines in the computing environment also requires a suitable configuration thereof; typically, this involves the assignment of new (network) identities to the virtual machines, so that the virtual machines are also to be reconnected for communicating via their new identities.

Different techniques for facilitating the reconnection of the virtual machines individually are known in the art.

For example, an activation engine (such as the "Virtual Solutions Activation Engine", or VSAE b IBM Corporation, trademarks thereof) may be embedded in each virtual machine. The activation engine is automatically launched at the bootstrap of the virtual machine, and it executes registered scripts that read a configuration file attached to the virtual machine and configures the virtual machine accordingly.

WO-A-2011/069782 (the entire disclosure of which is herein incorporated by reference) instead discloses a method for managing connections in a plug and play fashion. For this purpose, in a connection management structure a connection entry is provided for defining each role based connection between two computing machines; the connection entry defines a socket role (associated with socket attributes representing the information that needs to be provided by the computing machine having the socket role to establish connection with the other computing machine) and a plug role (associated with plug attributes representing the configuration actions that need to be executed by the other computing machine to establish connection with the computing machine having the socket rote).

Moreover, U.S. Pat. No. 7,849,168 (the entire disclosure of which is herein incorporated by reference) discloses a technique for managing a server migration process using a migration destination virtual server; for this purpose, a migration mechanism is used for changing settings of ports of a network switching apparatus according to corresponding transmitted setting information.

Sometimes, the entire service needs to be copied from a (source) computing environment to another (target) computing environment (for example, for migration, maintenance, load-balancing, scaling or backup reasons).

For this purpose, it is possible to deploy the same virtual appliance onto the target computing environment from the corresponding deployment package, again with a configuration of the target computing environment and of the corresponding virtual machines (for their correct operation thereon), and a reconnection of these virtual machines (for communicating via their new network identities). However, any upgrades of the service on the source computing environment (for example, patches applied to the operating system or the application programs of its virtual machines) is lost with the need of their repetition as well on the target computing environment.

Alternatively, it is possible to distribute the service directly from the source computing environment to the target computing environment. For this purpose, at first it is necessary to identify the virtual machines implementing the service on the source computing environment; each virtual machine is then copied onto the target computing environment individually. The target computing environment and the corresponding virtual machines are reconfigured (for their correct operation thereon), and these virtual machines are reconnected (for communicating via their new network identities). However, this does not allow distributing the service as a single entity.

In both cases, it is not possible to implement any versioning of the service as a whole.

SUMMARY

A simplified summary of the present disclosure is herein presented in order to provide a basic understanding thereof; however, the sole purpose of this summary is of introducing some concepts of the disclosure in a simplified form as a prelude to its following more detailed description, and it is not to be interpreted as an identification of its key elements nor as a delineation of its scope.

In one illustrative embodiment, a method, in a data processing system, is provided for distributing a service implemented by infra-connected source virtual machines on a source computing environment. The illustrative embodiment discovers characteristic information of the service comprising an indication of the intra-connected source virtual machines and of each intra-connection between the intra-connected source virtual machines. The illustrative embodiment copies the source virtual machines into corresponding target virtual machines on a target computing environment according to the characteristic information of the service in response to a distribution command of the service. The illustrative embodiment saves reconfiguration information of at least one selected target virtual machine of the target virtual machines having a source identity of the corresponding intra-connected source virtual machine in the source computing environment being reconfigured into a target identity of the at least one selected target virtual machine in the target computing environment. The illustrative embodiment causes each communication, addressed to each source identity by each target virtual machine intra-connected to a corresponding selected target virtual machine, to be redirected to the corresponding target identity according to the characteristic information of the service and to the reconfiguration information of the at least one selected target virtual machine.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of the following detailed description of the example embodiments of the present invention.

BRIEF DESCRIPTION OF THE SEVERAL VIEWS OF THE DRAWINGS

The solution of the present disclosure, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

In general terms, the present disclosure is based on the idea of distributing a service as a unit.

Particularly, one or more aspects of the present disclosure are set out in the independent claims and advantageous features thereof are set out in the dependent claims, with the wording of all the claims that is herein incorporated verbatim by reference (with any advantageous feature provided with reference to a specific aspect that applies mutatis mutandis to every other aspect).

Figure 1:
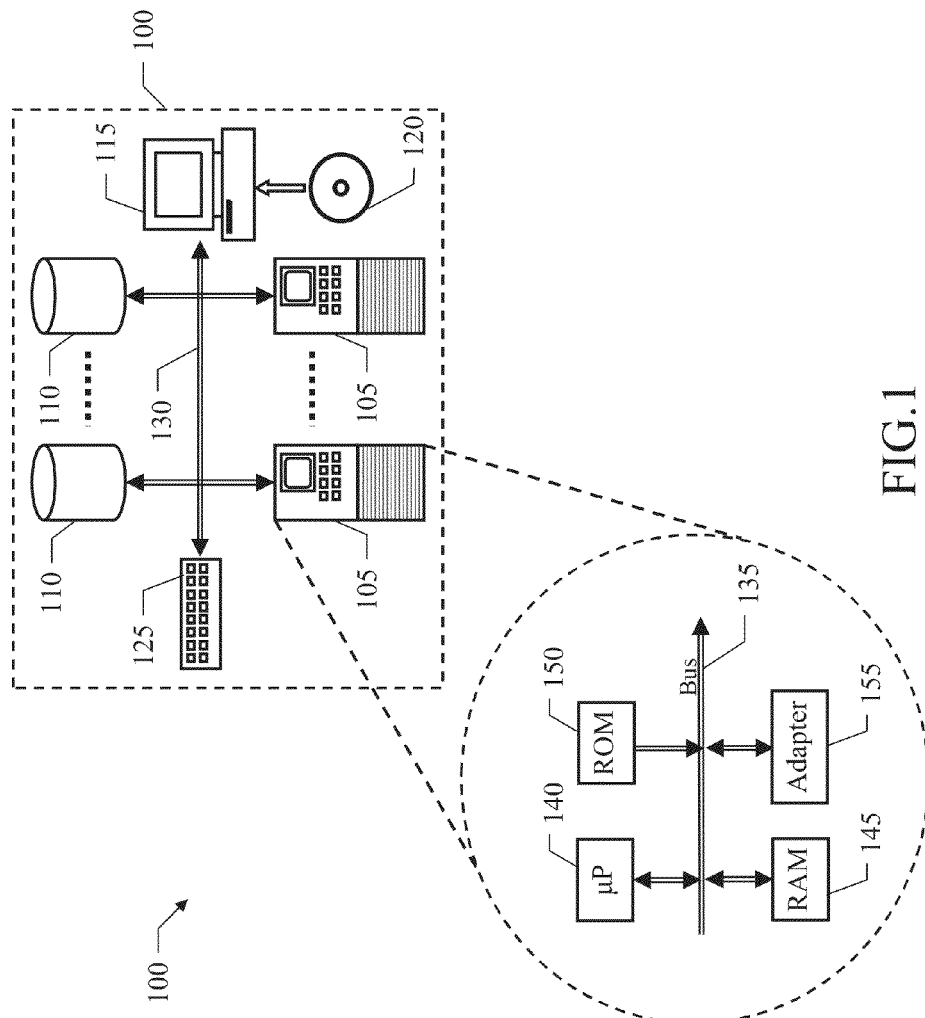
FIG. 1 shows a schematic block-diagram of a computing system wherein the solution according to an embodiment of the present disclosure may be applied.

With reference in particular to the FIG. 1, a schematic block-diagram is shown of a computing system 100 wherein the solution according to an embodiment of the present disclosure may be applied.

The computing system 100 is a server farm that comprises several computing machines operating as servers 105 (for example, of the rack or blade type) and several storage disks 110 (for example, of the RAID type) implementing mass-memories thereof; the server farm 100 also comprises a console 115 for controlling the servers 105 and the disks 110 (for example, a personal computer, also provided with a drive for reading removable storage devices 120, such as DVD-ROMs). A switch/router sub-system 125 manages any communications among the servers 105, the disks 110 and the console 115 (and with an external network, not shown in the figure); for this purpose, the servers 105, the disks 110 and the console 115 are connected to the switch/router sub-system 125 through a cabling sub-system 130.

A generic server 105 is formed by several units that are connected in parallel to a bus structure 135. In detail, a set of (one or more) microprocessors (μP) 140 controls operation of the server 105; a RAM 145 is directly used as a working memory by the microprocessors 140, and a ROM 150 stores basic code for a bootstrap of the server 105. Moreover, the server 105 comprises a network adapter 155, which is used to connect the server 105 to the cabling sub-system 130.

Figure 2B:
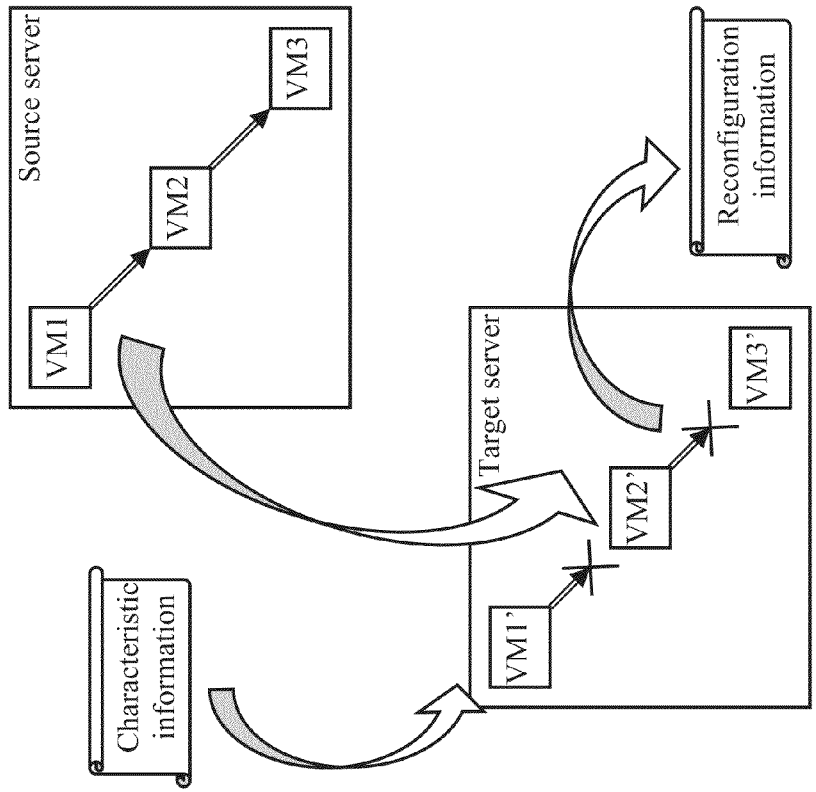
FIG. 2A-FIG. 2C show a pictorial representation of an exemplary application of the solution according to an embodiment of the present disclosure.
Figure 2A:
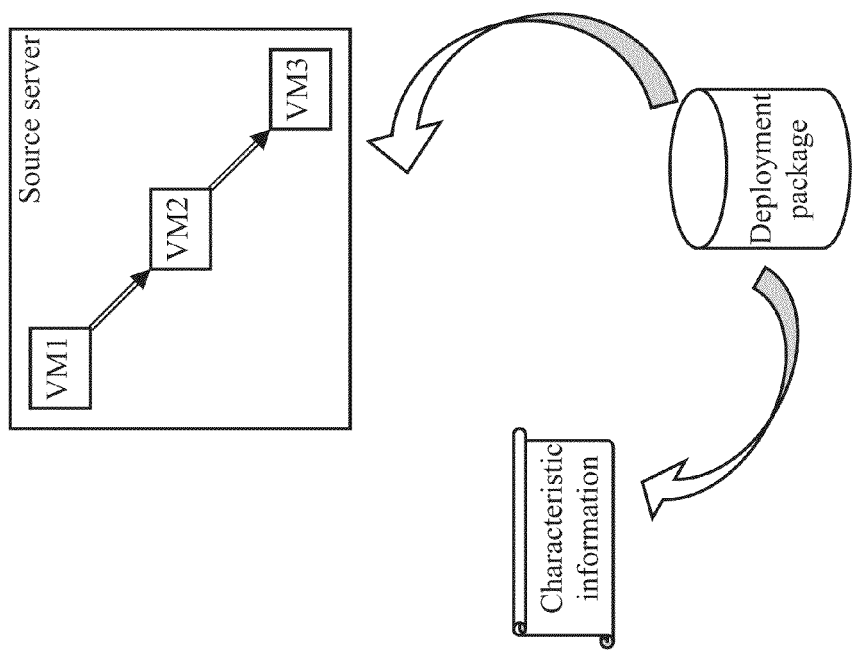
Figure 2C:
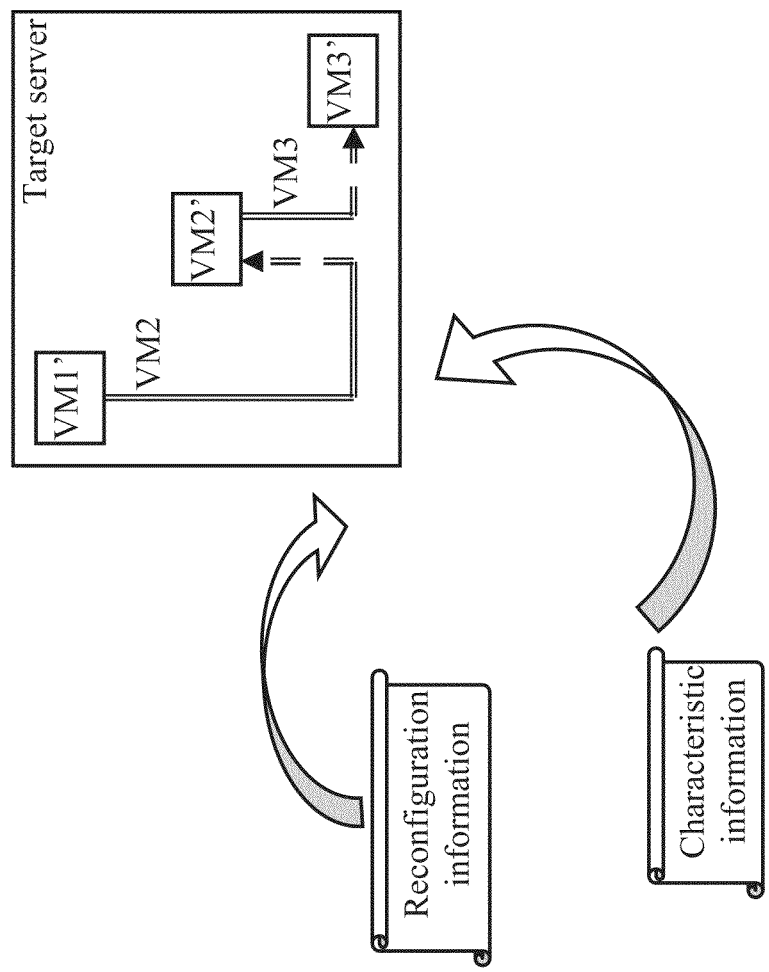

With reference now to the FIG. 2A-FIG. 2C, a pictorial representation is shown of an exemplary application of the solution according to an embodiment of the present disclosure.

Starting from the FIG. 2A, a service (for example, providing a web application) is installed on a source computing environment (for example, a source server of the above-described server farm). The service is implemented by a plurality of source virtual machines (three in the example at issue, denoted with VM1, VM2 and VM3) hosted on the source server; for this purpose, the source virtual machines VM1-VM3 are intra-connected in order to communicate among them (for example, with the source virtual machine VM1 that communicates with the source virtual machine VM2 and the source virtual machine VM2 that communicates with the source virtual machine VM3).

Characteristic information of the service is discovered. Particularly, the characteristic information of the service comprises an indication of the virtual machines that implement the service on the source server (i.e., VM1, VM2 and VM3 in the example at issue) and an indication of each intra-connection thereof (i.e., VM1→VM2 and VM2→VM3 in the example at issue).

Particularly, the service may have been deployed on the source server as a virtual appliance from a corresponding deployment package; the deployment package comprises software images of the virtual machines composing the virtual appliance and a deployment descriptor (with metadata of the deployment package and of the virtual machines). In this case, the characteristic information of the service may be extracted from this deployment descriptor.

Moving to the FIG. 2B, a distribution command of the service is submitted. In response thereto, the source virtual machines VM1, VM2 and VM3 are copied into corresponding target virtual machines (denoted with VM1', VM2' and VM3', respectively) of a target computing environment (for example, another target server of the same server farm); this operation is performed according to the characteristic information of the service. For example, it is possible to capture and store a software image of each source virtual machine (as identified in the characteristic information of the service); the target virtual machines are instantiated in the target server (according to the definition of the corresponding source virtual machines in the characteristic information of the service), and the corresponding software images are attached thereto. The target virtual machines VM1'-VM3' are then reconfigured (at least in part) by changing a source identity (of the corresponding source virtual machines VM1-VM3 in the source server) into a target identity (of the target virtual machines VM1'-VM3' in the target server), for example, their IP addresses. As a consequence, the intra-connections of the target virtual machines VM1'-VM3' may be broken; for example, in this case the target virtual machine VM1' cannot communicate with the target virtual machine VM2' and the target virtual machine VM2' cannot communicate with the target virtual machine VM3' any longer. Corresponding reconfiguration information (associating each source identity with its target identity) is saved (for example, in a dedicated repository).

Moving to the FIG. 2C, each communication (addressed to each source identity by each target virtual machine VM1'-VM3' that is intra-connected to the corresponding target virtual machine VM1'-VM3' that has been reconfigured) is caused to be redirected to the corresponding target identity; the redirection is performed according to the characteristic information of the service and the reconfiguration information of this target virtual machine VM1'-VM3'. For example, in the scenario at issue each communication from the target virtual machine VM1' that was formerly addressed to the source identity of the source virtual machine VM2 (as indicated in the characteristic information of the service) is redirected to the target identity of the target virtual machine VM2' (as indicated in its reconfiguration information), and likewise each communication from the target virtual machine VM2' that was formerly addressed to the source identity of the source virtual machine VM3 is redirected to the target identity of the target virtual machine VM3'.

In this way, any upgrades of the service on the Source server (or more generally on any source computing environment) after its deployment thereon (for example, patches applied to the operating system or the application programs of its virtual machines) is automatically transferred to the target server (or more generally to any target computing environment).

Moreover, this allows distributing the service as a single entity (from the source computing environment to the target computing environment).

As a result, the operation may be performed substantially in an automatic way, with no (or only limited) manual actions.

Figure 3:
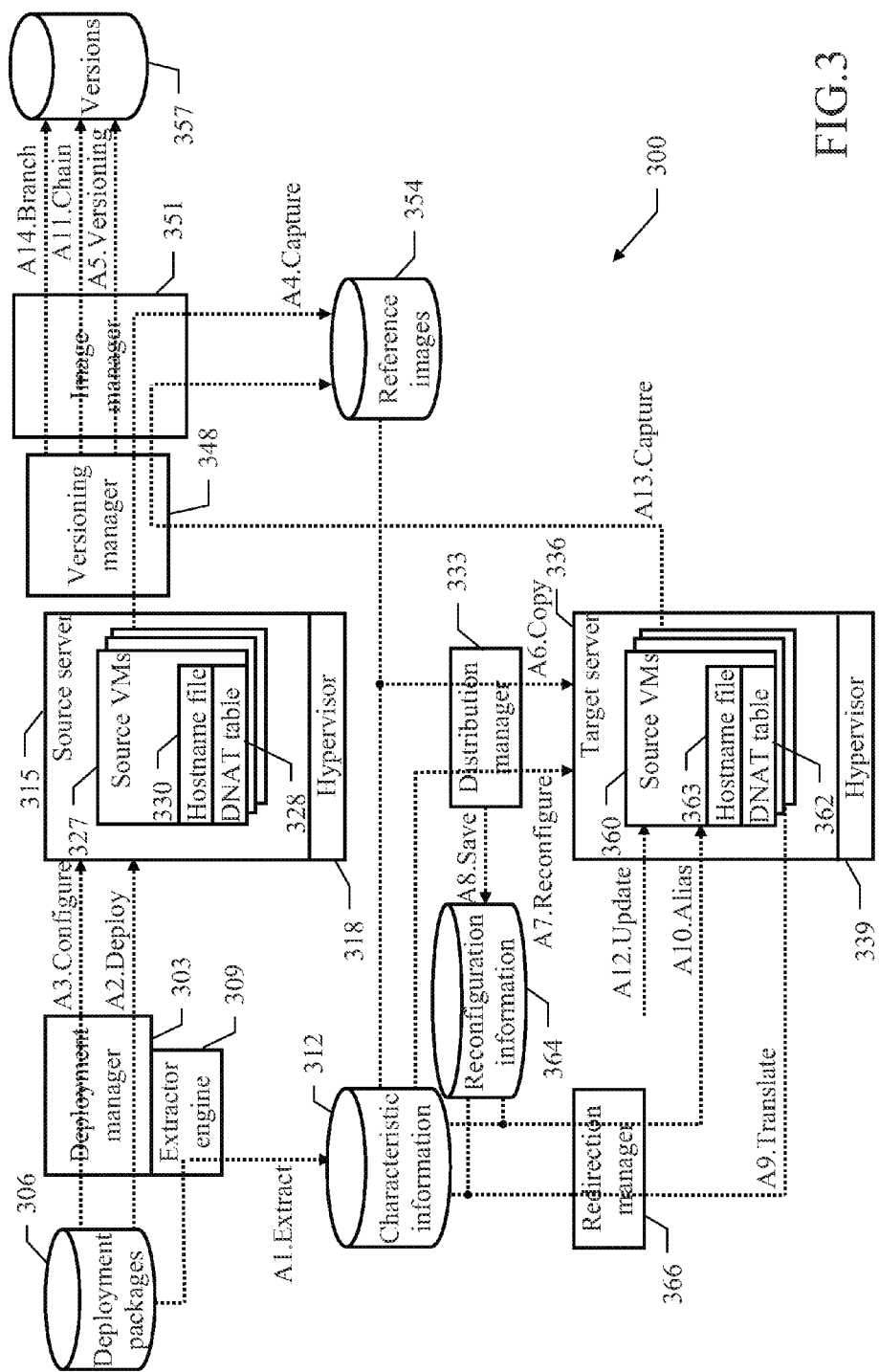
FIG. 3 shows a collaboration diagram representing the roles of the main software components that may be used to implement the solution according to an embodiment of the present disclosure.

With reference now to the FIG. 3, a collaboration diagram is shown representing the roles of the main software components that may be used to implement the solution according to an embodiment of the present disclosure.

Particularly, all the software components (programs and data) are denoted as a whole with the reference 300. The software components 300 are typically stored in the mass memory and loaded (at least partially) into the working memory of each (virtual or physical) computing machine when the programs are running. The programs are initially installed onto the mass memory, for example, from removable storage devices or from the network. In this respect, each software component may represent a module, segment or portion of code, which comprises one or more executable instructions for implementing the specified logical function. Particularly, the figure describes both the static structure of the software components and their dynamic behavior (by means of a series of exchanged messages, each one representing a corresponding operation, denoted with sequence numbers preceded by the letter "A").

In detail, a deployment manager 303 (for example, the IBM Workload Deployer by IBM Corporation, trademarks thereof) is used to manage the deployment of single virtual machines and complete software appliances. For this purpose, the deployment manager 303 accesses a deployment package repository 306 that stores the deployment packages of all the available virtual machines and virtual appliances. For example, when the deployment packages conform to the Open Virtualization Format (OVF) standard, each deployment package comprises one or more software images and a deployment descriptor (in addition to optional auxiliary files, such as certificates and manifests). The deployment descriptor is an XML file that describes the content of the deployment package, comprising a single virtual machine or a collection of multiple virtual machines (each one with one or more virtual disks), their possible intra-connections and the required system settings. The deployment package may be distributed as a single archive file the TAR format, referred to as Open Virtual Appliance (OVA).

In the solution according to an embodiment of the present disclosure, an extractor engine 309 (implemented either as a stand-alone component or as a plug-in of the deployment manager 303) further accesses the deployment package repository 306. The extractor engine 309 extracts the characteristic information of each service from the deployment package of the corresponding virtual appliance. Particularly, the characteristic information of the service comprises an indication of the virtual machines that are required to implement the service (for example, as defined in a VirtualSystemCollection element of the deployment descriptor); for each virtual machine (for example, as defined in a corresponding VirtualSystem element of the deployment descriptor), the characteristic information of the service comprises its features (for example, required virtual hardware), any intra-connection with other virtual machines (as defined by corresponding application program connections), the required system settings (for example, VLAN and network card settings), and its identity to be customized at the deployment time (for example, an IP address identifying participants in network communications using the Internet Protocol at an access level and a hostname identifying them at a logical level). The characteristic information of the services is stored into a corresponding repository 312 (action "A1.Extract").

A selected service is deployed as usual onto a source server 315. The source server 315 runs a hypervisor 318, which emulates a virtual operating platform for multiple virtual machines (for example, the VMware by VMware Inc., trademarks thereof). The deployment of the service on the source server 315 involves the instantiation of two or more source virtual machines 327 (for example, three source virtual machines VM1, VM2 and VM3) and the attachment of the corresponding software images thereto as virtual disks, according to their definition in the corresponding deployment descriptor. The operating system of each source virtual machine 327 may implement a Destination Network Address Translation (DNAT) service, which is used to translate destination IP addresses according to the content of DNAT table 328; moreover, the operating system of each source virtual machine 327 may also implement a resolution of the hostnames into the corresponding IP addresses locally; for this purpose, the operating system manages a hostname file 330 (for example, in the form of a plain text file) that maps the hostnames on the corresponding IP addresses (action "A2.Deploy"). Generally, the source server 315 and/or the source virtual machines 327, or at least part of them, are also configured (for example, manually by a system administrator or through a configuration script) for the correct operation of the source virtual machines 327 on the source server 315, as defined in the deployment descriptor. For example, the configuration of the source server 315 involves applying one or more system settings that are required for operation of the source virtual machines 327 (such as VLAN and network card settings). Moreover, the configuration of the source virtual machines 327 involves assigning new (network) source identities thereof, such as source IP addresses and source hostnames for a network domain of the source server 315 (denoted with IP1, IP2, IP3 and HN1, HN2, HN3 for the virtual machines VM1, VM2, VM3, respectively). The source virtual machines 327 are then reconnected (for their communication via the source IP addresses/hostnames); for this purpose, it is possible to use any reconnection technique known in the art, for example, based on an activation engine such as the VSAE or on the method disclosed in WO-A-2011/069782 (action "A3.Configure").

In the solution according to an embodiment of the present disclosure, a distribution manager 333 is provided for managing the distribution elsewhere of services that have already been deployed. For this purpose, the distribution manager 333 exposes a user interface that allows submitting distribution commands of selected services; in the example at issue, a distribution command may be submitted for distributing the service implemented by the source virtual machines 327 on the source server 315 to a target server 336, which likewise runs a hypervisor 339.

In response thereto, the distribution manager 333 instructs a versioning manager 348 to track a versioning of the service. For this purpose, the versioning manager 348 leverages an image manager 351 (for example, the IBM Virtual Image Library of the IBM SmartCloud Provisioning product by IBM Corporation, trademarks thereof) that is already used to manage a versioning of the software images individually. The image manager 351 controls a reference image repository 354 that stores software images being checked-in as reference images that cannot be modified any longer; the image manager 351 also controls a version repository 357 that stores a version identifier (for example, a version number) of each reference image in the reference image repository 354 and of each software image that has been deployed by checking-out a reference image therefrom. The versioning manager 348 captures a software image of each source virtual machine 327 (as defined in the corresponding characteristic information of the service that is extracted from the characteristic information repository 312) and checks it into the reference image repository 354 (action "A4.Capture"). The versioning manager 348 then assigns a source version number to the whole service that is implemented on the source server 315 by the source virtual machines 327 (for example, equal to the one of the corresponding virtual appliance); the versioning manager 348 stores the source version number into the version repository 357 (action "A5.Versioning").

At this point, the distribution manager 333 copies the source virtual machines 327 into corresponding target virtual machines 360 in the target server 336. More specifically, the distribution manager 333 instantiates the target virtual machines 360, as defined in the characteristic information of the service extracted from the characteristic information repository 312; the distribution manager 333 then attaches the corresponding software images checked out from the reference image repository 354 (comprising the corresponding DNAT tables and hostname files their operating systems, denoted with the references 362 and 363, respectively) as virtual disks to the target virtual machines 360, as indicated in the same characteristic information of the service (action "A6.Copy"). The target server 336 and/or the target virtual machines 360, or at least part of them, are also reconfigured (for example, again manually by a system administrator or through a reconfiguration script) for the correct operation of the target virtual machines 360 on the target server 336, as indicated in the characteristic information of the service. For example, the reconfiguration of the target server 336 involves applying the system settings (such as VLAN and network card settings) indicated in the characteristic information of the service. Moreover, the reconfiguration of the target virtual machines 360 involves changing their source identities (of the corresponding source target machines 327) into new (network) target identities, such as target IP addresses and target hostnames for a network domain of the target server 336; particularly, in the example at issue three target virtual machines VM1', VM2', VM3' (corresponding to the source virtual machines VM1, VM2, VM3) are assigned target IP addresses IP1', IP2', IP3' and target hostnames HN1', HN2', HN3' in place of the source IP addresses IP addresses IP1, IP2, IP3 and source hostnames HN1, HN2, HN3, respectively (action "A7.Reconfigure"). At the same time, the distribution manager 333 saves reconfiguration information indicative of these reconfigurations of the target virtual machines 360 (i.e., their target IP addresses and target hostnames in association with the corresponding source IP addresses and source hostnames) in a reconfiguration information repository 364 (action "A8.Save").

A redirection engine 366 manages the redirection of each communication among the target virtual machines 360 (as indicated in the characteristic information of the service extracted from the characteristic information repository 312) whose identity has been changed (as indicated in the corresponding reconfiguration information extracted from the reconfiguration information repository 364). For example, for each target virtual machine 360 whose target IP address is different from the corresponding source IP address (as indicated in the reconfiguration information), the redirection engine 366 adds an entry to the DNAT table 362 of each target virtual machine 360 intra-connected thereto (as indicated in the characteristic information of the service), which entry maps the source IP address on the target IP address. In the example at issue, assuming that the source virtual machine VM1 communicates with the source virtual machine VM2 and the source virtual machine VM2 communicates with the source virtual machine VM3, the DNAT table 362 of the target virtual machine VM1' maps the source IP address IP2 on the target IP addresses IP2', and the DNAT table 362 of the target virtual machine VM2' maps the source IP address IP3 on the target IP addresses IP3'. Therefore, for each IP packet containing one of the source IP addresses IP2 and IP3 in a destination address field of its header, the operating system of the target virtual machine VM1' and VM2' translates this source IP address into the corresponding target IP address IP2' and IP3', respectively; in this way, the IP packet is correctly transmitted to the target virtual machine 360 identified by the target IP address IP2' and IP3' (action "A9.Translate"). In addition or in alternative, for each target virtual machine 360 whose target hostname is different from the corresponding source hostname (as indicated in the reconfiguration information), the redirection engine 366 adds the target hostname as an alias of the source hostname into the hostname file 363 of each target virtual machine 360 intra-connected thereto (as indicated in the characteristic information of the service); moreover, if the target IP address of the target virtual machine 360 is different from the corresponding source IP address as well (again as indicated in the reconfiguration information), the redirection engine 366 also replaces the source IP address with the target IP address in the same hostname file 363. In the example at issue, the hostname file 363 of the target virtual machine VM1' that mapped the source hostname HN2 on the source address IP2 now maps the source/target hostnames HN2-HN2' on the target IP addresses IP2', and the hostname file 363 of the target virtual machine VM2' that mapped the source hostname HN3 on the source IP address IP3 now maps the source/target hostnames HN3-HN3' on the target IP addresses IP3'. Therefore, each target hostname HN2' and HN3' is correctly resolved into the target IP address IP2' or IP3', respectively (action "A10.Alias"). In both cases, the changes are injected into the target virtual machines 360, so that they are automatically available after their booting; moreover, the changes are applied only at the level of their operating systems, without requiring any data migration of the corresponding application programs.

At this point, the distribution manager 333 instructs the versioning manager 348 to assign a (new) target version number to the service that is implemented on the target server 336 by the target virtual machines 360. The target version number is chained to the corresponding source version number (of the service on the source server 315 from which it has been distributed); for example, the target version number may be set equal to the source version number with the addition of a sub-version number, such as v.1 and v.1.1, respectively (action "A11.Chain").

During its lifecycle, the service on the target server 336 may undergone several updates; for example, it is possible to apply patches to the operating systems and the application programs of the target virtual machines 360, or to upgrade them to new releases thereof (action "A12.Update"). The service so updated on the target server 336 (hereinafter referred to as updated service) may be distributed elsewhere as well. For this purpose, a distribution command of the updated service is submitted to the distribution manager 333, In response thereto, as above the distribution manager 333 instructs the versioning manager 348 to capture a software image of each (updated) target virtual machine 360 and checks it into the reference image repository 354 (action "A13.Capture"). The versioning manager 348 then assigns a (new) updated version number to the updated service. The updated version number branches from the source version number (of the service on the source server 315 from which the service on the target server 336 has been distributed); for example, the updated version may be set equal to the source version number with its last sub-version number incremented by 1, such as v.1 and v.2, respectively (action "A14.Branch"). The distribution of the updated service then proceeds in the same way as described above.

All of the above implements a versioning of the service as a whole. This significantly facilitates their management, especially in large computing systems wherein each service may be deployed in a high number of versions. For example, this allows browsing version trees and searching the services using different criteria (such as location, name, description, operating systems, application programs, versions, last modifications), identifying drifting among distributed services (such as due to applied patches or upgrades, added or removed application programs), finding clusters of similar services (i) order to reduce their sprawling by consolidating them into a small number of standard versions thereof that are similar).

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), and the term a/an should be intended as one or more items (unless expressly indicated otherwise).

For example, an embodiment provides a method for distributing a service implemented by a plurality of source virtual machines on a source computing environment. The method comprises the following steps. Characteristic information of the service is discovered: the characteristic information of the service comprises an indication of the source virtual machines and of each intra-connection thereof. The source virtual machines are copied into corresponding target virtual machines on a target computing environment, according to the characteristic information of the service, in response to a distribution command of the service. Reconfiguration information is saved of at least a selected one of the target virtual machines, which had a source identity of the corresponding source virtual machine in the source computing environment reconfigured into a target identity of the selected target virtual machine in the target computing environment. Each communication, addressed to each source identity by each target virtual machine intra-connected to the corresponding selected target virtual machine, is caused to be redirected to the corresponding target identity; the redirection is performed according to the characteristic information of the service and to the reconfiguration information of the selected target virtual machine.

However, the service may be of any type (for example, an intranet application) and it may be implemented by any number and type of virtual machines (two or more, implemented on any virtualization layer such as Xen). The characteristic information of the service may indicate the source virtual machines and their intra-connection in any way (for example, according to the identities on the source computing environment), and it may be discovered in any way (see below). The source virtual machines may be copied into the corresponding target virtual machines in any way (for example, directly therefrom and comprising their moving), in response to any distribution command of the service (for example, a remote procedure call). The source virtual environment and the target virtual environment may be of any type (for example, a test environment and a production environment, implemented in the same or in different servers). The reconfiguration information may be saved in any way (even in a simple variable that is used to reconnect the target virtual machines as soon as they are reconfigured). The identities of the virtual machines may be of any type and they may be changed in any way (for any number of selected target virtual machines), and the communications may be of any type and they may be redirected in any way (see below).

In an embodiment, the characteristic information of the service further comprises an indication of a set of one or more system settings of the source computing environment for operation of the source virtual machines; the method further comprises applying the system settings to the target computing environment.

However, the system settings may be in any number and of other type (for example, security attributes).

In an embodiment, said discovering characteristic information of the service comprises extracting the characteristic information of the service from a deployment descriptor associated with a deployment package, which has been used to deploy a virtual appliance corresponding to the service on the source computing environment.

However, the virtual appliance may have been deployed from a deployment package of any type (for example, conforming to the VMDK format; the deployment package may have a deployment descriptor with any format (for example, a proprietary one) and associated therewith in any way (for example, either embedded in or separated from the deployment package). In any case, the possibility of discovering the characteristic information of the service in another way (for example, by introspecting the source virtual machines directly) is not excluded.

In an embodiment, said saving reconfiguration information of at least a selected one of the target virtual machines comprises saving the reconfiguration information of said at least one selected target virtual machine having a source network address of the corresponding source virtual machine being reconfigured into a target network address of the selected target virtual machine.

However, the network addresses may be of any type (for example, IP addresses of the IPv4, IPv6, public or private type, IPX addresses, X25 addresses).

In an embodiment, said causing each communication, addressed to each source identity by each target virtual machine infra-connected to the corresponding selected target virtual machine, to be redirected to the corresponding target identity comprises translating the source network address into the corresponding target network address in a destination identifier of the communication.

However, any destination identifier of any communication may be translated in any way (for example, a one-to-one translation, a one-to-many translation to hide an entire IP address space); moreover, the translation may also be applied to a source identifier of the communication (in addition or in alternative to the destination identifier thereof).

In an embodiment, said saving reconfiguration information of at least a selected one of the target virtual machines comprises saving the reconfiguration information of said at least one selected target virtual machine having a source network name of the corresponding source virtual machine being reconfigured into a target network name of the selected target virtual machine.

However, the network names may be of any type (for example, any human-readable labels formed either by simple names or qualified names with appended corresponding domain names).

In an embodiment, said causing each communication, addressed to each source identity by each target virtual machine intra-connected to the corresponding selected target virtual machine, to be redirected to the corresponding target identity comprises adding each target network name as an alias of the corresponding source network name to a network name resolution table.

However, the name resolution table may be of any type (for example, an XML file), and it may be updated in any other way (for example, replacing the source network names with the corresponding target network names); moreover, the network names may be resolved in any way (for example, with a remote Domain Name System (DNS) service).

In an embodiment, said causing each communication, addressed to each source identity by each target virtual machine intra-connected to the corresponding selected target virtual machine, to be redirected to the corresponding target identity further comprises replacing the source network address associated with each source network name in the network name resolution table with the corresponding target network address.

However, the target network addresses may remain unchanged in the name resolution table, with their next translation by the DNAT service.

More generally, the redirection of the communications may be implemented in different, alternative of additional ways (for example, by reconnecting the target virtual machines with any technique known in the art).

In an embodiment, the method further comprises saving a representation of the source virtual machines, and assigning a source version identifier of the service on the source computing environment to the representation of the source virtual machines.

However, the representation of the source virtual machines may be saved in any way (for example, in a single package), and any source version identifier may be assigned thereto (for example, of the alphanumeric type, even independently of the corresponding virtual appliance).

In an embodiment, the method further comprises assigning a target version identifier to the service on the target computing environment; the target version identifier is chained to the source version identifier.

However, the target version identifier may be chained to the source version identifier in any way (for example, at the same level in a corresponding version tree); however, the target version identifier may also be set equal to the source version identifier.

In an embodiment, the method further comprises updating the target virtual machines at least in part. A representation of the updated target virtual machines is saved, and an updated version identifier is assigned to the representation of the updated virtual machines; the updated version identifier branches from the source version identifier.

However, the updated version identifier may be linked to the source version identifier in any way (for example, branching from the target version identifier); moreover, similar considerations apply if the source virtual machines are updated (at least one part) and another updated version identifier is assigned thereto.

More generally, the version identifiers may be defined in other ways (for example, as roots starting new version chains or appended to other version chains).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A further embodiment provides a computer program configured for causing a computing system to perform the steps of the above-described method when the computer program is executed on the computing system.

A further embodiment provides a computer program product comprising a non-transitory computer readable medium embodying a computer program, the computer program being loadable into a working memory of a computing system thereby configuring the computing system to perform the same method.

However, the above-described solution may be implemented as a stand-alone software program, as a plug-in for a deployment manager or even directly in the deployment manager itself. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system," Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A further embodiment provides a system comprising means configured for performing the steps of the above-described method.

However, the method may also be carried out on a system based on a different architecture (for example, a local, wide area, global, cellular or satellite network), and exploiting any type of (wired and/or wireless) connections. However, its implementation on a stand-alone computing machine is not excluded. Each computing machine may have another structure or may comprise similar elements; moreover, it is possible to replace the computing machine with any code execution entity, either based on a physical machine or a virtual machine (such as a PDA, a mobile phone, and the like), or with a combination of multiple entities (such as a multi-tier architecture, a grid computing infrastructure, and the like).

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The invention claimed is:

1. A method for distributing a service implemented by intra-connected source virtual machines on a source computing environment, the method comprising:
    discovering characteristic information of the service comprising an indication of the intra-connected source virtual machines and of each intra-connection between the intra-connected source virtual machines,
    copying the source virtual machines into corresponding target virtual machines on a target computing environment according to the characteristic information of the service in response to a distribution command of the service,
    saving reconfiguration information of at least one selected target virtual machine of the target virtual machines having a source identity of the corresponding intra connected source virtual machine in the source computing environment being reconfigured into a target identity of the at least one selected target virtual machine in the target computing environment, and
    causing each communication, addressed to each source identity by each target virtual machine intra-connected to a corresponding selected target virtual machine, to be redirected to the corresponding target identity according to the characteristic information of the service and to the reconfiguration information of the at least one selected target virtual machine.

2. The method according to claim 1, wherein the characteristic information of the service further comprises an indication of a set of one or more system settings of the source computing environment for operation of the source virtual machines, the method further comprising:
    applying the one or more system settings to the target computing environment.

3. The method according to claim 1, wherein the discovering of the characteristic information of the service comprises:
    extracting the characteristic information of the service from a deployment descriptor associated with a deployment package being used to deploy a virtual appliance corresponding to the service on the source computing environment.

4. The method according to claim 1, wherein the saving of the reconfiguration information of the at least one selected target virtual machine of the target virtual machines comprises:
    saving the reconfiguration information of the at least one selected target virtual machine having a source network address of the corresponding source virtual machine being reconfigured into a target network address of the at least one selected target virtual machine.

5. The method according to claim 4, wherein the causing of each communication, addressed to each source identity by each target virtual machine intra-connected to the corresponding selected target virtual machine, to be redirected to the corresponding target identity comprises:
    translating the source network address into the target network address of the at least one selected target virtual machine in a destination identifier of the communication.

6. The method according to claim 1, wherein the saving of the reconfiguration information of the at least one selected target virtual machine of the target virtual machines comprises:
    saving the reconfiguration information of the at least one selected target virtual machine having a source network name of the corresponding source virtual machine being reconfigured into a target network name of the at least one selected target virtual machine.

7. The method according to claim 6, wherein the causing of each communication, addressed to each source identity by each target virtual machine intra-connected to the corresponding selected target virtual machine, to be redirected to the corresponding target identity comprises:
    adding each target network name as an alias of the corresponding source network name to a network name resolution table.

8. The method according to claim 4, wherein the causing of each communication, addressed to each source identity by each target virtual machine intra-connected to the corresponding selected target virtual machine, to be redirected to the corresponding target identity comprises:
    replacing a source network address associated with each source network name in a network name resolution table with a corresponding target network address.

9. The method according to claim 1, further comprising:
    saving a representation of the intra-connected source virtual machines, and
    assigning a source version identifier of the service on the source computing environment to the representation of the intra-connected source virtual machines.

10. The method according to claim 9, further comprising:
    assigning a target version identifier to the service on the target computing environment, the target version identifier being chained to the source version identifier.

11. The method according to claim 10, further comprising:
    updating the target virtual machines at least in part,
    saving a representation of the updated target virtual machines, and
    assigning an updated version identifier to the representation of the updated virtual machines, the updated version identifier branching from the source version identifier.

12. A computer program product comprising a non-transitory computer readable storage medium having a computer readable program stored therein, wherein the computer readable program, when executed on a computing device, causes the computing device to:
    discover characteristic information of a service comprising an indication of intra-connected source virtual machines and of each intra-connection between the intra-connected source virtual machines,
    copy the source virtual machines into corresponding target virtual machines on a target computing environment according to the characteristic information of the service in response to a distribution command of the service,
    save reconfiguration information of at least one selected target virtual machine of the target virtual machines having a source identity of the corresponding intra-connected source virtual machine in a source computing environment being reconfigured into a target identity of the at least one selected target virtual machine in the target computing environment, and
    cause each communication, addressed to each source identity by each target virtual machine intra-connected to a corresponding selected target virtual machine, to be redirected to the corresponding target identity according to the characteristic information of the service and to the reconfiguration information of the at least one selected target virtual machine.

13. A system comprising:
    a processor; and
    a memory coupled to the processor, wherein the memory comprises instructions which, when executed by the processor, cause the processor to:

discover characteristic information of a service comprising an indication of intra-connected source virtual machines and of each intra-connection between the intra-connected source virtual machines, copy the source virtual machines into corresponding target virtual machines on a target computing environment according to the characteristic information of the service in response to a distribution command of the service, save reconfiguration information of at least one selected target virtual machine of the target virtual machines having a source identity of the corresponding intra-connected source virtual machine in a source computing environment being reconfigured into a target identity of the at least one selected target virtual machine in the target computing environment, and cause each communication, addressed to each source identity by each target virtual machine intra-connected to a corresponding selected target virtual machine, to be redirected to the corresponding target identity according to the characteristic information of the service and to the reconfiguration information of the at least one selected target virtual machine.

14. The system according to claim 13, wherein the characteristic information of the service further comprises an indication of a set of one or more system settings of the source computing environment for operation of the source virtual machines, and wherein the instructions further cause the processor to:

apply the one or more system settings to the target computing environment.

15. The system according to claim 13, wherein the instructions to discover the characteristic information of the service further causes the processor to:

extract the characteristic information of the service from a deployment descriptor associated with a deployment package being used to deploy a virtual appliance corresponding to the service on the source computing environment.

16. The system according to claim 13, wherein the instructions to save the reconfiguration information of the at least one selected target virtual machine of the target virtual machines further causes the processor to:

save the reconfiguration information of the at least one selected target virtual machine having a source network address of the corresponding source virtual machine being reconfigured into a target network address of the at least one selected target virtual machine.

17. The system according to claim 16, wherein the instructions to cause each communication, addressed to each source identity by each target virtual machine intra-connected to the corresponding selected target virtual machine, to be redirected to the corresponding target identity further causes the processor to:

translate the source network address into the target network address of the at least one selected target virtual machine in a destination identifier of the communication.

18. The system according to claim 16, wherein the instructions to cause each communication, addressed to each source identity by each target virtual machine intra-connected to the corresponding selected target virtual machine, to be redirected to the corresponding target identity further causes the processor to:

replace source network address associated with each source network name in a network name resolution table with a corresponding target network address.

19. The system according to claim 13, wherein the instructions to save the reconfiguration information of the at least one selected target virtual machine of the target virtual machines further causes the processor to:

save the reconfiguration information of the at least one selected target virtual machine having a source network name of the corresponding source virtual machine being reconfigured into a target network name of the at least one selected target virtual machine.

20. The system according to claim 19, wherein the instructions to cause each communication, addressed to each source identity by each target virtual machine intra-connected to the corresponding selected target virtual machine, to be redirected to the corresponding target identity further causes the processor to:

add each target network name as an alias of the corresponding source network name to a network name resolution table.

* * * * *